United States Patent [19]

Karmarkar et al.

[11] Patent Number: 4,914,563

[45] Date of Patent: Apr. 3, 1990

[54] METHOD AND APPARATUS FOR OPTIMIZING SYSTEM OPERATIONAL PARAMETERS THROUGH AFFINE SCALING

[75] Inventors: Narendra K. Karmarkar, North Plaintfield; Jeffrey C. Lagarias, Summit, both of N.J.

[73] Assignee: AT&T Bell Laboratories, Murray Hill, N.J.

[21] Appl. No.: 899,046

[22] Filed: Aug. 22, 1986

[51] Int. Cl.⁴ .......................................... G06F 15/20
[52] U.S. Cl. ..................................... 364/148; 364/402
[58] Field of Search ............................... 364/148, 402

[56] References Cited

U.S. PATENT DOCUMENTS

| | | | |
|---|---|---|---|
| 4,744,026 | 5/1988 | Vanderbei | 364/402 |
| 4,744,027 | 5/1988 | Bayer et al. | 364/402 |
| 4,744,028 | 5/1988 | Kamarkar | 364/402 |

OTHER PUBLICATIONS

*Linear Programming and Extensions*, G. B. Danzig, 1963, Princeton University Press, Princeton, N.J., pp. 156–166.
"A Polynomial Algorithm in Linear Programming", Doklady Akademiia Nauk SSSR, 224:S, L. G. Khachiyan, 1979 (translated in 20 *Soviet Mathematics Doklady* 1, pp. 191–194, 1979).
"The Ellipsoid Method: A Survey", *Operations Research*, vol. 29, No. 6, R. G. Bland et al., 1981, pp. 1039–1091.
"A New Polynomial-Time Algorithm for Linear Programming", *Proceedings* of the ACM Symp. on Theory of Computer, N. K. Karmarkar, Apr. 30, 1984, pp. 302–311.
"The Ellipsoid Method and Its Consequences in Combinatorial Optimization", *Combinatorica* 1(2), Grotschel et al., 1981, pp. 169–197.

*Primary Examiner*—Allen MacDonald
*Attorney, Agent, or Firm*—Henry T. Brendzel

[57] ABSTRACT

Method and apparatus for optimizing the operational state of a system employing iterative steps that approximately follow a projective scaling trajectory or an affine scaling trajectory, or curve, in computing from its present state, $x_0$ to a next state $x_1$ toward the optimum state. The movement is made in a transformed space where the present (transformed) state of the system is at the center of the space, and the curve approximation is in the form of a power series in the step size. The process thus develops a sequence of tentative states $x_1$, $x_2$, $x_n$ .... It halts when a selected suitable stopping criterion is satisfied, and assigns the most recent tentative state as the optimized operating state of the system.

14 Claims, 9 Drawing Sheets

FIG. 4

INITIALIZE (100)

MINIMIZE $\underline{c}^T \underline{x}$

SUBJECT TO $A\underline{x} = \underline{0}$ $\underline{e}^T\underline{x} = n$ $\underline{x} \geq 0$ WITH INITIAL FEASABLE POINT SET $\underline{x}^{(0)} = \underline{e}$ $\underline{c}$ NORMALIZED   SET $i = 0$
SELECT: M, $\epsilon$ STOPPING PARAMETERS
   m = NUMBER OF POWER SERIES TERMS

COMPUTE PROJECTION OPERATOR (110)

CURRENT ITERATE $\underline{x} = \underline{x}^{(i)}$
$\underline{X} = \text{diag}(x_i)$ $\underline{\tilde{A}} \quad \dfrac{AX}{e^T}$ $\underline{Q} = ((\underline{\tilde{A}}\,\underline{\tilde{A}}^T)^{-1}\underline{\tilde{A}})$ $\underline{P} = (\underline{I} - \underline{\tilde{A}}^T(\underline{\tilde{A}}\,\underline{\tilde{A}}^T)^{-1}\underline{\tilde{A}})$ $\underline{\tilde{c}} = \underline{P}\,\underline{X}\,\underline{c}$

STOPPING CRITERIA (120)

$\underline{w} = \underline{Q}\,\underline{D}\,\underline{c}$ $\underline{z} = \underline{D}^2(\underline{c} - \underline{\tilde{A}}^T\underline{w})$ $\gamma = \max\left(\dfrac{z_i}{x_i^2}\right)$ $\delta = -\min\left(\dfrac{z_i}{x_i}\right)$ IS $\gamma + M\delta < \dfrac{\epsilon}{n}|\underline{c}^T\underline{x} + 1|$?

YES → OUTPUT: (150)
$\underline{x}$ = PRIMAL SOLUTION
$\underline{w}$ = DUAL SOLUTION
$(w_n - \underline{c}^T\underline{x}$ = DUAL NO ↓ (loop back)

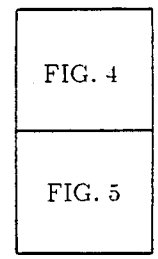

FIG. 6

| FIG. 4 |
| FIG. 5 |

FIG. 5

Box 130:

RECURSIVLY
COMPUTE COEFFICIENTS $a_j$ IN $p(t) = [\ d_j t^i$ AND
TRANSFORM POWER - SERIES APPROXIMATION $y(t)jp)$ $$\underline{y}(t;\rho) = \underline{e} + \sum_{k=1}^{m} \underline{v}_k(\rho)\, t^k$$

INITIALIZE:    $V_o(p) = {}_o(p) = I$ $$\alpha_1 = \frac{(e^T P\ c)}{(c^T P\ c)}$$

$$\underline{v}_1(\rho) = -\alpha_1 \underline{\tilde{c}}$$

$$\underline{V}_1(\rho) = \mathrm{diag}(\underline{v}_1(\rho))$$

$$\underline{\Delta}_1(\rho) = -\underline{V}_1(\rho).$$

RECURSION:  FOR $2 \leq k \leq M$ do $$\alpha_k = -\alpha_1 \underline{\tilde{c}}^T \underline{P}\left(\sum_{j=1}^{k-1} \underline{V}_j(\rho)\,\underline{\Delta}_{k-j}(\rho)\,\underline{e}\right),$$

$$\underline{v}_k(\rho) = -\underline{P}\left(\sum_{j=1}^{k-1} \underline{V}_j(\rho)\underline{\Delta}_{k-j}(\rho)\underline{e} + \alpha_k \underline{c}\right)$$

$$\underline{V}_k(\rho) = \mathrm{diag}(\underline{v}_k(\rho)),\ \text{and}$$

$$\underline{\Delta}_k(\rho) = -\sum_{j=o}^{k-1} \underline{\Delta}_j(\rho)\underline{V}_{k-j}(\rho)$$

Box 140:

FIND NEXT FEASIBLE POINT

COMPUTE $y(t,p)$ FOR $t = 45, 9, 8,\ldots 1$

UNTIL FEASIBLE POINT (ALL $y_i > 0$) FOUND

SET $y$ EQUAL TO FEASIBLE VECTOR $y(t,p)$

OBTRAIN NEXT ITERATE BY INVERSE PROJECTION TRANSFORMATION $$x^{(i+1)} = \frac{nX\underline{y}}{e^T X \underline{y}}$$

UPDATE $i = i + 1$

METHOD AND APPARATUS FOR OPTIMIZING SYSTEM OPERATIONAL PARAMETERS THROUGH AFFINE SCALING

TECHNICAL FIELD

This invention relates to systems for optimizing processes such as the process of resource allocation. More particularly, this invention relates to apparatus and methods for optimizing processes in technological and industrial environments to minimize the costs or maximize the benefits of such processes.

BACKGROUND OF THE INVENTION

The need for optimization of systems arises in a broad range of technological and industrial areas. Examples of such a need include the assignment of transmission facilities in telephone transmission systems, oil tanker scheduling, control of the product mix in a factory, deployment of industrial equipment, inventory control, and others. In these examples a plurality of essentially like parameters are controlled to achieve an optimum behavior or result. Sometimes, the parameters controlling the behavior of a system have many different characteristics but their effect is the same; to wit they combine to define the behavior of the system. An example of that is the airline scheduling task. Not only must one take account of such matters as aircraft, crew, and fuel availability at particular airports, but it is also desirable to account for different costs at different locations, the permissible routes, desirable route patterns, arrival and departure time considerations vis-a-vis one's own airline and competitor airlines, the prevailing travel patterns to and from different cities, etc. Two common denominators of all of these applications is the existence of many parameters or variables that can be controlled, and the presence of an objective—to select values for the variables so that, in combination, an optimum result is achieved.

The relationships describing the permissible values of the various variables and their relationship to each other form a set of constraint relationships. Optimization decisions are typically subject to constraints. Resources, for example, are always limited in overall availability and, sometimes, the usefulness of a particular resource in a specific application is limited. The challenge, then, is to select values of the parameters of the system so as to satisfy all of the constraints and concurrently optimize its behavior, i.e., bring the level of "goodness" of the objective function to its maximum attainable level. Stated in other words, given a system where resources are limited, the objective is to allocate resources in such a manner so as to optimize the system's performance.

One method of characterizing optimization tasks is via the linear programming model. Such a model consists of a set of linear equalities and inequalities that represent the quantitative relationships between the various possible system parameters, their constraints, and their costs (or benefits).

Some optimization tasks cannot be represented by such systems of linear relationships. They involve higher powers of the unknowns or other nonlinearities in the relationships and hence are not encompassed by the linear programming model.

It should be noted that the optimization tasks discussed above pertain to real physical problems for which businessmen require solutions. It may also be noted that it is not unusual for a physical problem to be represented by mathematical expressions from which parameter values can be specified for use in the physical world to construct or operate a physical system. Typical prior art examples of the use of mathematical models to characterize physical systems are the construction of complex filters, design and characterization of radio antennas, and control of rubber-molding operations.

At one time, artisans were unable to explicitly solve many of the optimization tasks that were facing them. To compensate for that inability, people used intuition and experience to arrive at what they felt was a preferred assignment of parameter values. Businessmen who were good at it prospered, and those who were not good at it failed. More recently, quantitative tools have become available to assist businessmen in these decision-making activities. For example, manufacturing plants use linear programming models to control production schedules and inventory levels that will satisfy sales demands and, at the same time, minimize production and inventory costs. Similarly, the AT&T communication network uses linear programming models to route telephone traffic over a network of transmission facilities so that the entire traffic demand is satisfied, transmission costs are minimized, and at the same time, no transmission links are overloaded.

The best known prior art approach to solving allocation problems posed as linear programming models is known as the simplex method. It was invented by George B. Dantzig in 1947, and described in *Linear Programming and Extensions*, by George B. Dantzig, Princeton University Press, Princeton, New Jersey, 1963. In the simplex method, the first step is to select an initial feasible allocation as a starting point. The simplex method gives a particular method for identifying successive new allocations, where each new allocation improves the objective function compared to the immediately previous identified allocation, and the process is repeated until the identified allocation can no longer be improved.

The operation of the simplex method can be illustrated diagrammatically. In two-dimensional systems the solutions of a set of linear constraint relationships are given by a polygon of feasible solutions. In a three-dimensional problem, linear constraint relationships form a three dimensional polytope of feasible solutions. As may be expected, optimization tasks with more than three variables form higher dimensional polytopes. FIG. 1 depicts a polytope contained within a multi-dimensional hyperspace (the representation is actually shown in three dimensions for lack of means to represent higher dimensions). It has a plurality of facets, such as facet 11, and each of the facets is a graphical representation of a portion of one of the constraint relationships in the formal linear programming model. That is, each linear constraint defines a hyperplane in the multi-dimensional space of polytope 10, and a portion of that plane forms a facet of polytope 10. Polytope 10 is convex, in the sense that a line joining any two points of polytope 10 lies within or on the surface of the polytope.

It is well known that there exists a solution of a linear programming model which maximizes (or minimizes) an objective function, and that the solution lies at a vertex of polytope 10. The strategy of the simplex method is to successively identify from each vertex the adjacent vertices of polytope 10, and select each new vertex (each representing a new feasible solution of the optimization task under consideration) so as to bring the feasible solution closer, as measured by the objective function, to the optimum point 21. In FIG. 1, the simplex method might first identify vertex 12 and then move in a path 13 from vertex to vertex (14 through 20) until arriving at the optimum point 21.

The simplex method is thus constrained to move on the surface of polytope 10 from one vertex of polytope 10 to an adjacent vertex along an edge. In linear programming problems involving thousands, hundreds of thousands, or even millions of variables, the number of vertices on the polytope increases correspondingly, and so does the length of path 13. Moreover, there are so-called "worst case" problems where the topology of the polytope is such that a substantial fraction of the vertices must be traversed to reach the optimum vertex.

As a result of these and other factors, the average computation time needed to solve a linear programming model by the simplex method appears to grow at least proportionally to the square of the number of constraints in the model. For even moderately-sized allocation problems, this time is often so large that using the simplex method is simply not practical. This occurs, for example, where the constraints change before an optimum allocation can be computed, or the computation facilities necessary to optimize allocations using the model are simply not available at a reasonable cost. Optimum allocations could not generally be made in "real time" (i.e., sufficiently fast) to provide more or less continuous control of an ongoing process, system or apparatus.

To overcome the computational difficulties in the above and other methods, N. K. Karmarkar invented a new method, and apparatus for carrying out his method, that substantially improves the process of resource allocation. In accordance with Karmarkar's method, which is disclosed in U.S. patent application Ser. No. 725,342 filed Apr. 19, 1985, a starting feasible solution is selected within polytope 10, and a series of moves are made in the direction that, locally, points in the direction of greatest change toward the optimum vertex of the polytope. A step of computable size is then taken in that direction, and the process repeats until a point is reached that is close enough to the desired optimum point to permit identification of the optimum point.

Describing the Karmarkar invention more specifically, a point in the interior of polytope 10 is used as the starting point. Using a change of variables which preserves linearity and convexity, the variables in the linear programming model are transformed so that the starting point is substantially at the center of the transformed polytope and all of the facets are more or less equidistant from the center. The objective function is also transformed. The next point is selected by moving in the direction of steepest change in the transformed objective function by a distance (in a straight line) constrained by the boundaries of the polytope (to avoid leaving the polytope interior). Finally, an inverse transformation is performed on the new allocation point to return that point to the original variables, i.e., to the space of the original polytope. Using the transformed new point as a new starting point, the entire process is repeated.

Karmarkar describes two related "rescaling" transformations for moving a point to the center of the polytope. The first method uses a projective transformation, and the second method uses an affine transformation. These lead to closely related procedures, which we call projective scaling and affine scaling, respectively. The projective scaling procedure is described in detail in N. K. Karmarkar's paper, "A New Polynomial Time Algorithm for Linear Programming", *Combinatorica*, Vol. 4, No. 4, 1984, pp. 373-395, and the affine scaling method is described in the aforementioned N. Karmarkar '342 application and in that of Vanderbei, filed Apr. 11, 1986 and bearing the Ser. No. 851,120.

The advantages of the Karmarkar invention derive primarily from the fact that each step is radial within the polytope rather than circumferential on the polytope surface and, therefore, many fewer steps are necessary to converge on the optimum point.

Still, even in Karmarkar's method and apparatus a substantial number of iterations is required when the number of variables to be controlled is very large. Also, the calculations that need to be performed are not trivial because they involve transformations of very large matrices. Fortunately, in most applications the matrices are rather sparse because most of the coefficients of most of the variables are zero. This sparsity permits simplifications to be made which result in substantial improvements in performing resource allocation assignments with Karmarkar's apparatus and method.

The number of iterations that is required in Karmarkar's method is related to the number of variables and to the chosen size for each step. But because the step taken is a straight line which only locally points in the direction of steepest change in the objective function, it is clear that large step sizes may not be taken for fear of moving away from the shortest path toward the optimum point, and possibly causing the process to converge even slower than with smaller steps.

SUMMARY OF THE INVENTION

We discovered that Karmarkar's formulation of the problem, in effect, describes a vector field which at every point within the polytope defines a best direction for each and every starting point; and our invention employs this discovery to advantage. From each and every starting point within the polytope there is a unique curve from that point to the optimum vertex, that is obtained by following the vector field exactly. This curve may be specified by a differential equation, and we call the curves obtained by following this differential equation P-trajectories. In addition, there is a second vector field, which we call the affine scaling vector field, that arises from another linear programming method. Following affine scaling vector field exactly yields another set of curves which we call A-trajectories. The invention comprises methods and apparatus for approximately following these curves to an optimum solution of the linear program in a series of discrete steps.

More particularly, in one embodiment of our invention iterative steps are taken that approximately follow a P-trajectory. The procedure starts from an initial point that corresponds to a feasible state of the system to be optimized, $x_o$, and produces a sequence of tentative states $x_1, x_2, \ldots, x_n$. It halts when a selected suitable stopping criterion is satisfied, and selects the most recent tentative state as the operating state of the system. Still more specifically, at each iteration k, the $(k+1)^{st}$ iteration is obtained by using a projective transformation $\Phi_k$ that maps the state of the system, $x_k$, to the center e of a transformed linear problem, and advancing in the transformed problem to a next point, $y_{k+1}$, making use of a suitable power series approximation to a P-trajectory through e of the transformed problem.

The power series approximation uses a power series of order $\geq 2$ in at least one step. A $j^{th}$ order power series approximation for the step taken at the center of the polytope, e, has the form $$y(t) = e + v_1 t + \ldots + v_j t^j \tag{1}$$

where the vectors $v_1, \ldots, v_j$ are vectors that depend on the constraints of the physical system to be optimized, the optimization objective function, and a chosen reparameterization variable. The new state of the system, $x_{k+1}$, is determined by using the inverse projective transformation $x_{k+1} = \Phi_k^{-1}(y_{k+1})$.

In addition to the projective transformation realization of our invention, another version of our method follows A-trajectories. The method of our invention develops iterative steps to follow a selected A-trajectory using suitable power series approximations. Our procedure advances to a state $x_{k+1}$ using a power series approximation to an A-trajectory at the current point $x_k$ of the problem.

BRIEF DESCRIPTION OF THE DRAWING

FIGS. 4-5 illustrate the sequence of steps employed in a projective scaling embodiment of our invention;

FIG. 6 shows the connective relationship of FIGS. 4-5;

DETAILED DESCRIPTION

Conceptual Underpinnings of Our Optimization Process

As discussed above, the behavior of large physical systems is subject to many factors which impose various bounds within which the system must operate. These bounds can often be expressed in the form of a collection of linear constraint relationships which can be represented in multi-dimensional space by a convex polytope, with every point within the polytope and on its surface representing a permissible state of the system. The operational state of the system can also be viewed subjectively by characterizing the system as being at a "good" state or at a "not so good" state, based on some set of measuring criteria. The measuring criteria, or operational criteria, can often be formulated in the form of a linear relationship, called the objective function, which can also be defined on the multi-dimensional space.

Figure 2:
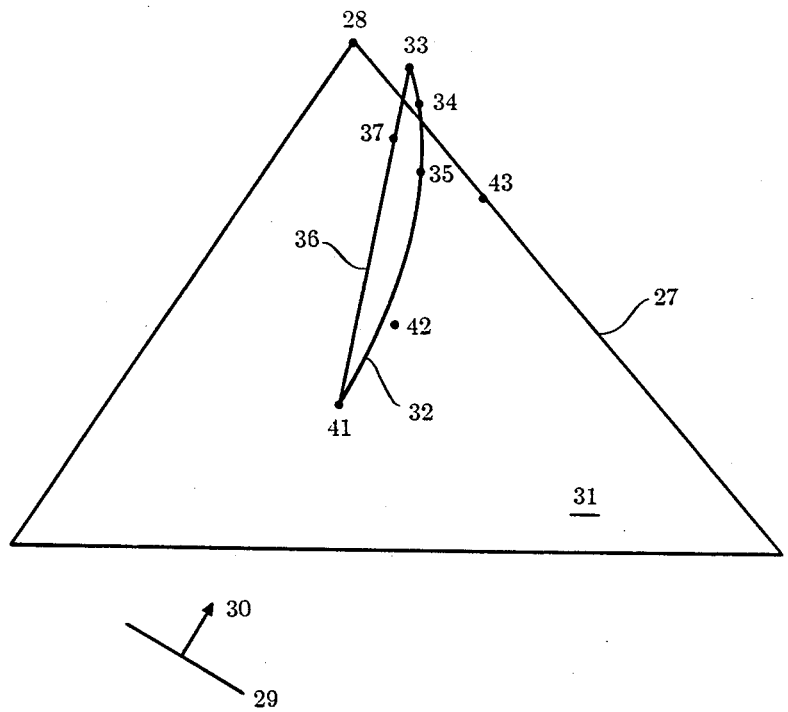
FIG. 2 illustrates the concept of moving within the polytope from an interior point toward a vertex, in a direction generally specified by an objective function.

Thus, in a two-dimensional system such as shown in FIG. 2, the constraints may form triangle 31 which encompasses the set of all feasible operational states of the system. Line segment 29 defines a line of constant "goodness" of the system state, and arrow 30 describes the direction of increased "goodness". It is intuitively apparent that when the system of FIG. 2 is at some state within triangle 31, such as point 41, there is a direction of movement that would bring the system to another point within triangle 31 (i.e., another state of the system), that is better. Such a better point might be point 42. It is also apparent that the final optimum operating point of the FIG. 2 system, for the particular objective function chosen, is point 28. What may not, perhaps, be apparent is that the direction of movement of our optimization process from point 41 to point 42 is only generally in the direction of arrow 30. In fact, for most of the points within triangle 31 the direction of movement of our optimization process is not the direction of arrow 30. It may be observed, for example that when moving from point 41 exactly in the direction of arrow 30, point 43 on line 27 is reached. One can go no further in the direction of arrow 30 but that point is not an optimum point for the system. In light of that, it becomes apparent that the best direction of movement at any one point within triangle 31 is in the direction of point 28, rather than the direction of arrow 30. Alas, to know that point 28 must be reached is to know the solution itself.

We discovered, however, that for each objective function, we can define a vector field within the triangle (or the polytope, in the general case) that at each point within the polytope—and not just at the center—suggests a good direction for moving away from the point and toward the vertex preferred by the objective function. Using this vector field, we have found a way to identify a locus of points within the convex polytope forming a particular smooth curve, which defines a curve by which the optimum point can be reached. This curved path can be regarded as defining the "most direct" path to a vertex of the polytope that is the optimum state of the system in accordance with a specified objective function. Since the curve is smooth, when sufficient information is available about it, it can be approximated to any degree of accuracy by any one of the known approximation techniques, such as by a Taylor series expansion. When that is done, an optimum solution of a linear programming problem may be obtained from any feasible state of the system in a small number of steps or, perhaps, even in a single step. The latter depends on the complexity of the problem at hand or, phrased differently, on the difficulty of approximating accurately the curve defining the most direct path to the desired vertex. When computation of a close approximation is inadvisable (e.g., takes too much time), an approximation of the curve with fewer terms permits reaching the optimum vertex in a small number of steps.

Many different power series approximations to the curve can be obtained using different power series parameters.

More generally, one may consider power series approximations to curves obtained by following a vector field inside the polytope of feasible solutions which is defined as a steepest descent direction of the objective function with respect to any specified Riemannian geometry on the interior of the polytope. The affine scaling vector field is a special case of such a generalized steepest descent vector field.

Projective Scaling Power Series Optimization Process

The method of our invention calls for the use of a curved path in the hyperspace of the controllable parameters of a physical system in order to move from a non-optimum state of the system to an optimum state of the system (in accordance with a stated objective function). This curved path is identified and traversed in accordance with the steps described below and depicted in the general flow chart of FIG. 3. More detailed flowcharts are presented in FIGS. 4-5 and 7-8.

Figure 3:
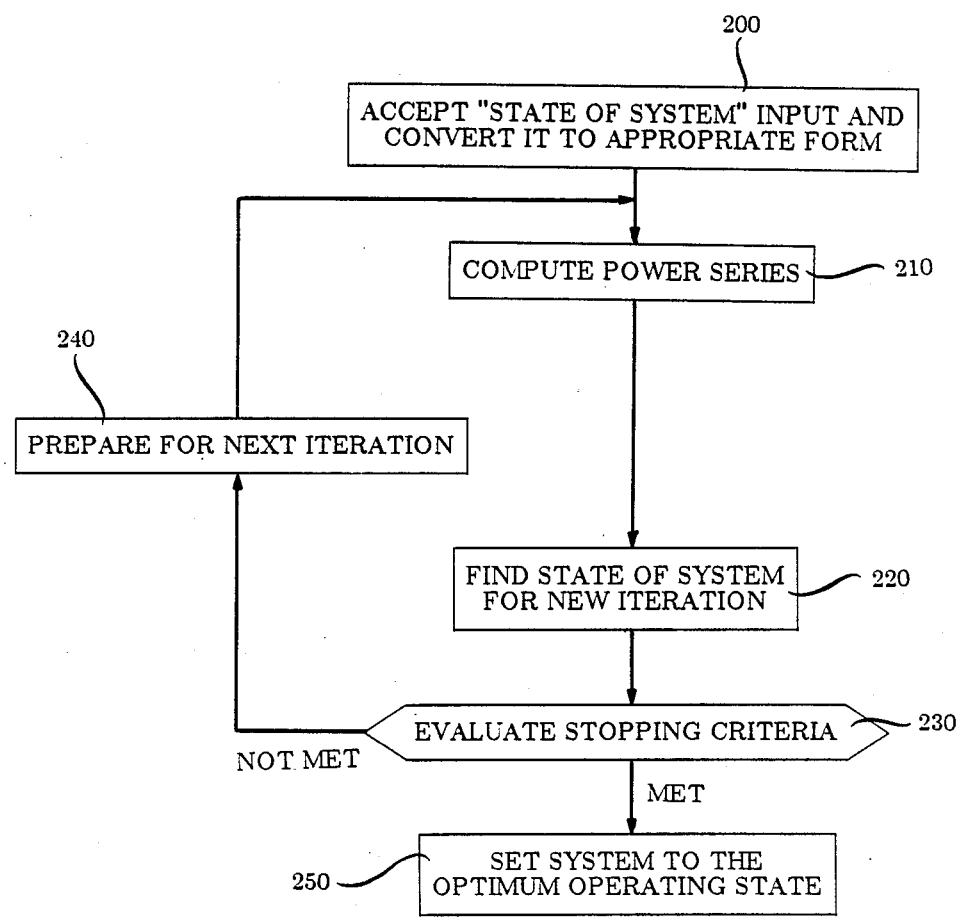
FIG. 3 is a general block diagram outlining the method of our invention.
Figure 9:
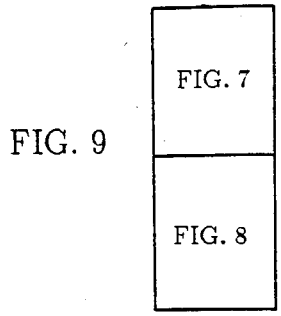
FIG. 9 shows the connective relationship of FIGS. 7-8.

In FIG. 3, block 200 accepts input from the physical system and represents the input in a form that we call a canonical form, to enable efficient processing of the data. This input represents the state of the system to be optimized, or more specifically, this input reports on those parameters of the system that affect the system performance and that are controllable.

Blocks 210, 220, 230, and 240 form the main iteration loop of our method. For a given tentative state of the system, block 210 develops the appropriate power series approximation of the curve to be traversed and block 220 determines a new tentative state for the system. Based on a preselected stopping test the tentative state of the system is evaluated and if, according to block 230, the test criteria are not met (i.e., the system is not sufficiently close to optimum), the data is conditioned for the next iteration in block 240 and fed back to block 210. When it is determined that the tentative state of the system has met the stopping criteria applied in block 230, control passes to block 250 where the system is set to its optimized operating state.

The general block diagram of FIG. 3 holds true for both the projective scaling power series method (that approximately follows P-trajectories), and the affine scaling power series method (that approximately follows A-trajectories). The only difference may be in the point at which the main iteration loop is entered.

With reference to FIGS. 4-5, which describe the projective scaling method, the first step in our method (block 100 in FIG. 4) is to accept input information concerning the given attributes of the physical system we wish to optimize (controllable parameters, constraints, and objective function) and to transform this information into a structure of relationships that defines the task in the aforementioned canonical form, to wit:

$$\text{minimize: } c^T x \quad (2)$$

$$\text{Subject to: } Ax = 0$$
$$e^T x = n$$
$$x > 0$$

with side condition $$Ae = 0,$$

such that $c^T x$ is a normalized objective function. An objective function is normalized if $c^T x \geq 0$ for all feasible solutions x, and $c^T x = 0$ for some feasible solution x. In the above statement of the task, $x = (x_1, x_2, \ldots, x_n)$ is a vector of the system attributes which, as a whole, describe the state of the system; n is the number of such system attributes; $c = (c_1, c_2, \ldots, c_n)$ is the objective function which minimizes costs, where "cost" is whatever adversely affects the performance of the system; $c^T$ is the transpose of vector c; $A = (a_{11}, a_{12}, \ldots, a_{ij}, \ldots, a_{mn})$ is an m by n matrix of constraint coefficients; $b = (b_1, b_2, \ldots, b_m)$ is a vector of m constraint limits; and e is a vector of all 1's. In addition, the input provides three parameters m, M and $\epsilon$ which specify the degree of approximation the method intends to attain. The constant, m, specifies the degree of the polynomial approximation to be calculated, and M and $\epsilon$ are two stopping criterion parameters for which $M = 10^8$ and $\epsilon = 10^{-8}$ are typical values used in practice.

Transforming a general statement of the optimization task (e.g., in the form $Ax \leq b$) to the canonical form of equation (2) can be done in accordance with prior art techniques, such as the one described in Section 5 of an article by N. K. Karmarkar entitled "A New Polynomial-Time Algorithm for Linear Programming," Combinatorica 4(4), pp. 373-395, 1984. That technique consists of the addition of slack variables, adding an artificial variable if necessary to produce a feasible solution, and application of a suitable projective transformation.

With the canonical form of block 100 in place, our starting point is $x_0 = e$ and we proceed with the step described by block 110 in FIG. 4, as we set an iteration index, i, to zero.

Before proceeding with the block 110 description, it may be useful to note that one way to think of our procedure is that there exists a curved space within the polytope, and our task is to take steps in that curved space that bring us closer to the optimum operating point of the system. If one can "flatten" that space, one can more easily take bigger steps. To that end, we introduce a reparameterization variable $\rho(t)$ such that $d\rho(t)/dt > 0$ for all $t \geq 0$, where t is the step size of the iteration, so that the space within the polytope is "flattened" with respect to the parameter t.

The particular choice of $\rho(t)$ affects the performance of our method. The simplest choice for $\rho(t)$ may be $\rho(t) = t$. A more general choice is $$\rho(t) = \sum_{j=1}^{k} a_j t^j \quad (3)$$

and choosing a good set of $\alpha$ coefficients is important.

To assist in choosing a reparameterization function, we develop in block 110 of FIG. 4 a projection operator $$P = (I - \bar{A}^T Q) \quad (4)$$

and a projected objective function $$\bar{c} = PXc \quad (5)$$

where
$Q = (\bar{A}\bar{A}^T)^{-1}\bar{A}$
$X = \text{diag}(x_i)$
I is the identity matrix (having 1's on the diagonal and 0's elsewhere),
$\bar{A}$ is the matrix A, with an additional row of all 1's appended to it,
the T superscript designates the matrix transpose operation, and
the $-1$ superscript designates the matrix inversion operation.

In the first iteration there is no reason to suppose that the present state of the system is, in fact, the optimum state of the system. However, having computed the projection operator and its components in block 110, it is convenient at this point to test the state of the system (actual or as tentatively reconfigured after each iteration) and determine whether to continue with the next iteration. This test is performed in block 120 by evaluating the inequality $$\gamma + M\delta < \frac{\epsilon}{n} |c^T x + 1| \qquad (6)$$

in which $$\delta = -\min\left(\frac{z_i}{x_i}\right),$$

$$\gamma = \max\left(\frac{z_i}{x_i^2}\right),$$

where the $z_i$ and $x_i$ are calculated using $$z = X^2(c - \overline{A}^T w), \qquad (7)$$

$$w = QXc.$$

As stated earlier, M and $\epsilon$ are preselected stopping criteria.

When the inequality (6) is satisfied, the iterative process terminates. The (primal) solution is then given by the vector x which, as stated earlier, is composed of the controllable system attributes. The vector $w=(w_1, \ldots w_m)$ is an associated vector dual solution, and $w_m - x^T c$ is the duality gap, which measures how close the objective function value for the solution obtained is to the optimal objective function value. When the inequality is satisfied, the values of x are communicated to block 150, as described hereinafter. When the inequality (6) is not satisfied, we proceed to compute $\rho(t)$ and the transformed power series approximation $y(t;\rho)$ in block 130, where $$y(t;\rho) = e + \sum_{k=1}^{m} v_k(\rho) t^k \qquad (8)$$

and, $$\rho(t) = \sum_{j=1}^{m} \alpha_j t^j. \qquad (9)$$

The $\alpha$ coefficient may be computed in a number of ways. Two ways that yield good results are described below. Both develop the $\alpha$ coefficients for $\rho(t)$ and the $v_k(\rho)$ coefficients for $y(t,\rho)$, recursively.

In accordance with the first technique, the recursive process begins by initializing $$V_0(\rho) = \Delta_0(\rho) = I, \qquad (10)$$

$$\alpha_1 = (e^T P c)/(c^T P c)$$

$$v_1(\rho) = -\alpha_1 \overline{c}$$

$$V_1(\rho) = \text{diag}(v_1(\rho)), \text{ and}$$

$$\Delta_1(\rho) = -V_1(\rho).$$

Then, for $1 < k \leq m$, the v and $\alpha$ coefficients are computed by $$\alpha_k = -\alpha_1 \overline{c}^T P \left( \sum_{j=1}^{k-1} V_j(\rho) \Delta_{k-j}(\rho) e \right), \qquad (11)$$

$$v_k(\rho) = -P \left( \sum_{j=1}^{k-1} V_j(\rho) \Delta_{k-j}(\rho) e \right) + \alpha_k \overline{c}$$

$$V_k(\rho) = \text{diag}(v_k(\rho)), \text{ and}$$

$$\Delta_k(\rho) = -\sum_{j=0}^{k-1} \Delta_j(\rho) V_{k-j}(\rho).$$

In the above recursive solution for $\rho(t)$, the formula being solved is $$\frac{1}{e^T P c} (c^T P x(\rho(t))) \equiv t \qquad (12)$$

as a power series in t.

Next we derive a second technique based on a different parameterization. In this parameterization we choose the coefficients $\alpha_j$ in such a way that $$e_i^T x(\rho(t)) \equiv t \qquad (13)$$

where $e_i$ is a vector of all zeros except a 1 in the $i^{th}$ coordinate position. The coordinate, i, is chosen by selecting a component in $\overline{c}$, such that $\overline{c}_i$ is the largest positive entry of $\overline{c}$, (choosing the smallest i in case of ties). For example, if $\overline{c}=(4, -2, 5, 5, 1)$ then a proper choice would be i=3. With i chosen, the recursion for making equation (13) hold is $$\alpha_1 = \overline{c}_i^{-1} \qquad (14)$$

and $$\alpha_k = -\alpha_1 e_i^T P \left( \sum_{j=1}^{k-1} V_j(\rho) \Delta_{k-j}(\rho) e \right). \qquad (15)$$

The $v_k(\rho)$ coefficients are calculated using this value of $\alpha_k$ as before, using equation (11).

Having determined the $\alpha$ and v coefficients, what is left is to select a step size. For $\rho(t)$ structured as above, a number of step selection methods may be used.

One very simple method is to first compute a trial tentative allocation, for a chosen large step, such as t=0.95. If the trial allocation is feasible then the new tentative state of the system may be equated with the computed trial allocation. If not, then lower values for t may be chosen, such as t=0.95, 0.9, 0.8, 0.7, ..., 0.1 and the feasibility determination repeated until a feasible point is found. We expect that a feasible point would almost certainly be found before t=0.2 and nearly always for t=0.95.

A second method for determining a step size is to minimize the "potential function" of Karmarkar, defined by $$g_c(y) = n \log (c^T y) - \sum_{i=1}^{n} \log (x_i) \qquad (16)$$

on the line segment connecting e (the starting point of the iteration) and $y'_1$ (the trial tentative allocation), to obtain a point $y_1$. This may be done by "line search," using standard prior art methods. Noting that $y'_1$ might be outside the polytope, we restrict the line search to that part of the line segment where all components $y_i$ are greater than 0.

A third method is to do a "line search" along the curve, $y(t,\rho)$ on the interval $0 \leq t \leq 1$ to minimize Karmarkar's potential function and to choose $y_1$ to be the minimizing point.

In FIG. 5, block 140 computes the step size in accordance with the first method. The initial step size taken is $t=0.95$, a trial tentative allocation, $y'_i$ is computed for this t, and the allocation is evaluated with respect to its feasibility (i.e., it is queried whether all components of $y' > 0$). The value of t is reduced as necessary, until a strictly feasible new tentative allocation $y_1$ is developed.

Once a feasible new tentative allocation is determined, a transformation of the determined state of the system is necessary in order to bring the system back to its original coordinates. This is accomplished in block 140 with the projective transformation $$x^{(i+1)} = (nXy/e^TXy). \tag{17}$$

The index i is incremented, and control passes to block 110 for the next iteration.

Affine Scaling Power Series Optimization Process

The above description illustrates a projective transformation method. Now we describe an affine scaling power series method, which approximately follows the somewhat different A-trajectories. It is very similar to the projective transformation method. This method produces a sequence of iterates $y_k$ starting from an initial point $y_0$; and is described in the flowchart of FIGS. 7-8.

Figure 7:
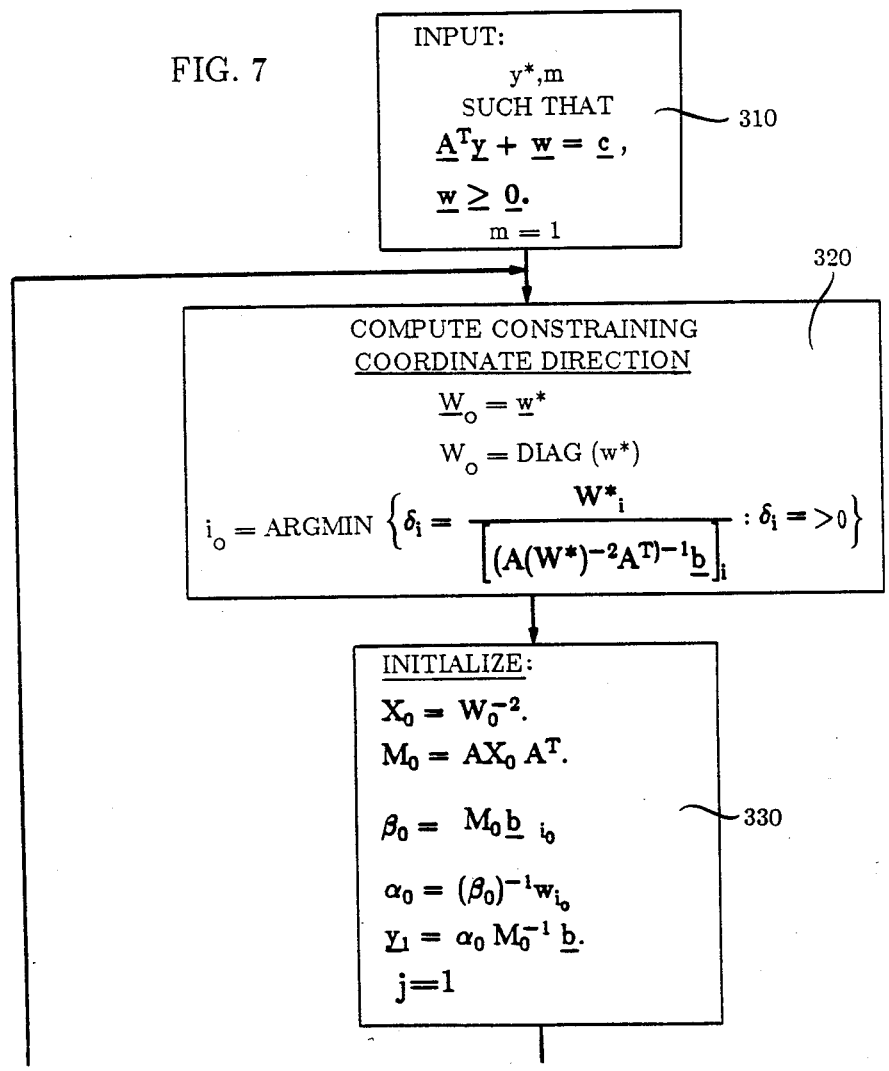
FIGS. 7-8 illustrate the sequence of steps employed in a affine scaling embodiment of our invention.

In FIG. 7, blocks 310, 320 and 330 serve the function of block 200 in FIG. 3. In block 310, the input linear program is required to be in standard dual form, which is:

$$\text{maximize } b^T y \tag{18}$$

$$\text{subject to } A^T y < c$$

where A is $m \times n$ matrix, b and y are $m \times 1$ vectors, and c is an $n \times 1$ vector. Such a representation can be obtained as the dual to the linear program given in the standard form of equation (2). By adding a vector of non-negative slack variables w, the above may be rewritten as:

$$\begin{aligned} \text{maximize } & b^T y \\ \text{subject to } & A^T y + w = c, \\ & w > 0. \end{aligned} \tag{19}$$

where w is an $m \times 1$ vector. The affine scaling differential equation for an A-trajectory is $$dy(t)/dt = \rho(t) [AW^{-2}A^T]^{-1} b, \tag{20}$$

$$y(0) = y_0,$$

where $$w = w(t;\rho) = c - A^T y(t;\rho), \tag{21}$$

$$W = W(t;\rho) = \text{diag}(w),$$

and $$\rho(t) = \sum_{j=0}^{m} \alpha_j t^j \tag{22}$$

is a power series used to reparameterize the A-trajectory.

The following describes a method giving one particular choice of $\rho(t)$, though other choices of $\rho(t)$ could be used. This choice of $\rho(t)$ is defined as follows. Starting at the current feasible point $y_k$, which we will denote $y^*$, let $w^* = (w_1^*, \ldots, w_m^*)$ be defined by $$w^* = c - A^T y^*. \tag{23}$$

The power series parameterization is chosen so that $$w(t;\rho(t)) \equiv (w_1(t;\rho(t)), \ldots, w_m(t;\rho(t))) \text{ satisfies}$$

$$w_{i_0}(t;\rho(t)) = (w^*)_{i_0} - (w^*)_{i_0} t \tag{24}$$

where $i_o$ is that coordinate index of the objective function that is most rapidly increasing. Specifically, $i_o$ is the smallest index that minimizes the function $$\delta_i = \frac{(w^*)_i}{[(A (W^*)^{-2} A^T)^{-1} b]_i} \tag{25}$$

over all i such that $$\delta_i > 0,$$

where $W^* = \text{diag}(w^*)$.

Selection of the coordinate index is depicted in block 320 in FIG. 5.

The idea behind using this particular reparameterization is that a linear approximation to the power series expression for $y(t;\rho)$ becomes infeasible at $t=1$, so we expect a step size to be on the order of $t=1$. The test embodied in equation (25) is a ratio test applied to a first order approximation to $w(t;\rho)$.

With the above formulation, the following recursion may be used to compute the power series expansions:

$$y(t;\rho) = \sum_{k=0}^{\infty} v_k t^k \tag{26}$$

and $$w(t;\rho) = \sum_{k=0}^{\infty} w_k t^k \tag{27}$$

We initialize the recursion as follows. Our initial data is $$v_0 = y^*, \tag{28}$$

from which $w_0$ is computed by:

$$w_0 = c - A^T v_0. \tag{29}$$

Now define auxiliary quantities $\{X_k\}$ by $$X(t) = W^{-2}(t) = \sum_{k=0}^{\infty} X_k t^k \tag{30}$$

where each $X_k$ is a diagonal matrix, and initialize with $$W_0 = \text{diag}(w_0)$$

$$X_0 = W_0^{-2}. \tag{31}$$

It is also useful to introduce the auxiliary matrix quantities $\{M_k\}$ defined by $$M(t) = AW(t)^{-2}A^T = \sum_{k=0}^{\infty} M_k t^k \qquad (32)$$

so that $$M_k = AX_k A^T \qquad (33)$$

and $$M_0 = AX_0 A^T. \qquad (34)$$

Next, compute $$\beta_0 = (M_0 b)_{i_0} \qquad (35)$$

and then initialize $$\alpha_0 = (\beta_0)^{-1} w_{i_0} \qquad (36)$$

where $w_{i_0}$ is the $i_0$th coordinate of $w_0$, and $i_0$ is the index determined in block 320. Lastly, we set $$v_1 = \alpha_0 M_0^{-1} b. \qquad (37)$$

All of the above initializations are done in block 330 in FIG. 7.

Figure 8:
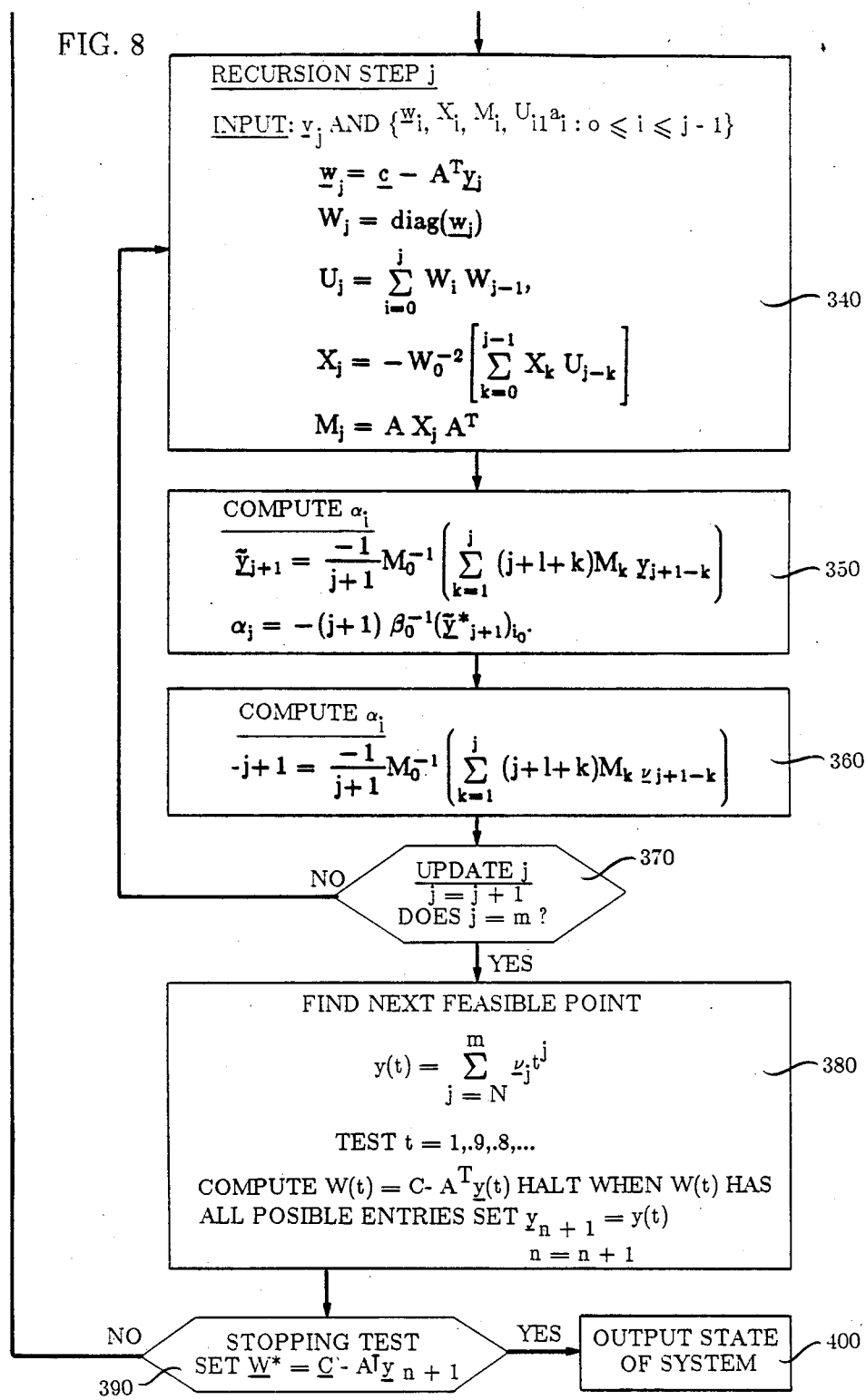

Following the initializations, the process of FIGS. 7-8 proceeds with a recursion step to develop the coefficients of the power series that describes the path along which the process moves toward its optimum state. At the beginning of the $(j+1)^{st}$ step the value up to and including all coefficients of $v_j$ is known, (as well as all $w_i$, $X_i$, $M_i$, $\alpha_i$ for $0 \leq i \leq j-1$). The values of $w_j$, $X_j$, $M_j$, $\alpha_j$ and $v_{j+1}$, are then computed in block 340, as follows.

$$w_j = c - A^T v_j \qquad (38)$$

$$W_j = \text{diag}(w_j)$$

$$X_j = -W_0^{-2}\left[\sum_{k=0}^{j-1} X_k \left(\sum_{l=0}^{j-k} W_l W_{j-k-l}\right)\right], \text{ and}$$

$$M_j = A X_j A^T.$$

Next, in block 350, $\bar{v}_{j+1}$ is computed using $$\bar{v}_{j+1} = \frac{-1}{j+1} M_0^{-1} \left(\sum_{k=1}^{j} (j+1-k) M_k v_{j+1-k}\right) \qquad (39)$$

and $\alpha_j$ is determined by solving $$\alpha_j = -(j+1)\beta_0^{-1}(\bar{v}_{j+1})_{i_0}. \qquad (40)$$

Lastly, in block 360, the value $$v_{j+1} = \bar{v}_{j+1} + \frac{\alpha_j}{j+1} M_0^{-1} b. \qquad (41)$$

is computed to complete the recursion step before entering the conditional block 370. The recursion is repeated for an many terms (m in FIG. 7) in the power series as is desired.

The computation of $X_j$ given by (38) may be simplified by computing, at the jth step (for $j \geq 1$) auxiliary quantities $$U_j = \sum_{i=0}^{j} W_i W_{j-i}, \qquad (42)$$

and saving all values $\{U_i : 1 \leq i \leq j\}$. Then the calculation of $X_j$ in equations (38) is replaced by $$X_j = -W_0^{-2}\left[\sum_{k=0}^{j-1} X_k U_{j-k}\right]. \qquad (43)$$

Having computed the coefficients for the power series, $$y(t) = \sum_{k=0}^{m} v_k t^k, \qquad (44)$$

one needs to select a step size, t. As before, we choose $t = 0.95, 0.9, \ldots, 1$ and check in block 380, for each t, whether $w(t)$ is strictly feasible, i.e., whether of $w(t)$ all entries are positive. The first of the values of t tested for which this holds true is selected, and the new vector $$y_{n+1} = y(t) \qquad (45)$$

is defined to be our next tentative state of the system, and is the starting point for the next iteration.

Figure 1:
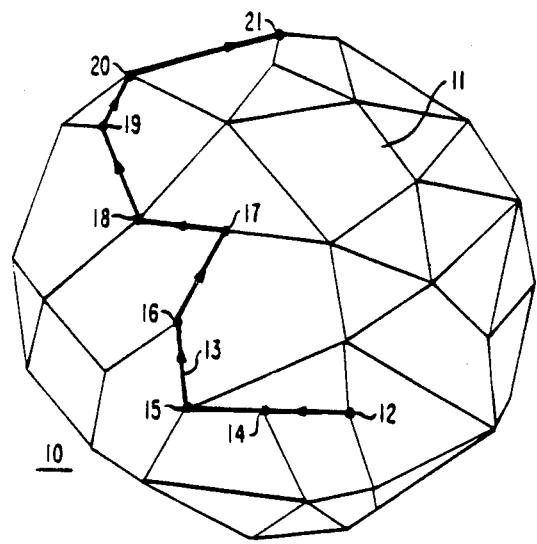
FIG. 1 depicts a hyperspace polytope representing a linear programming problem, and the prior art technique of obtaining a solution by traversing along edges of the polytope.

To determine whether a next iteration is necessary, the newly developed tentative state is tested in block 390. As a stopping rule we use the ratio test $$\frac{|c^T y_a - c^T y_{n+1}|}{|c^T y_{n-1}|} < \epsilon \qquad (46)$$

where $\epsilon$ is a stopping criterion value given as an input quantity. When the computed ratio test is greater than $\epsilon$, control passes to block 330 and a new iteration is initiated. When the ratio is less than $\epsilon$, we conclude that the developed tentative state, y, corresponds closely to the optimum vertex in the polytope of FIG. 1, and we conclude that the desired state of the system has been reached.

Illustrative Apparatus Embodying Our Invention

Figure 10:
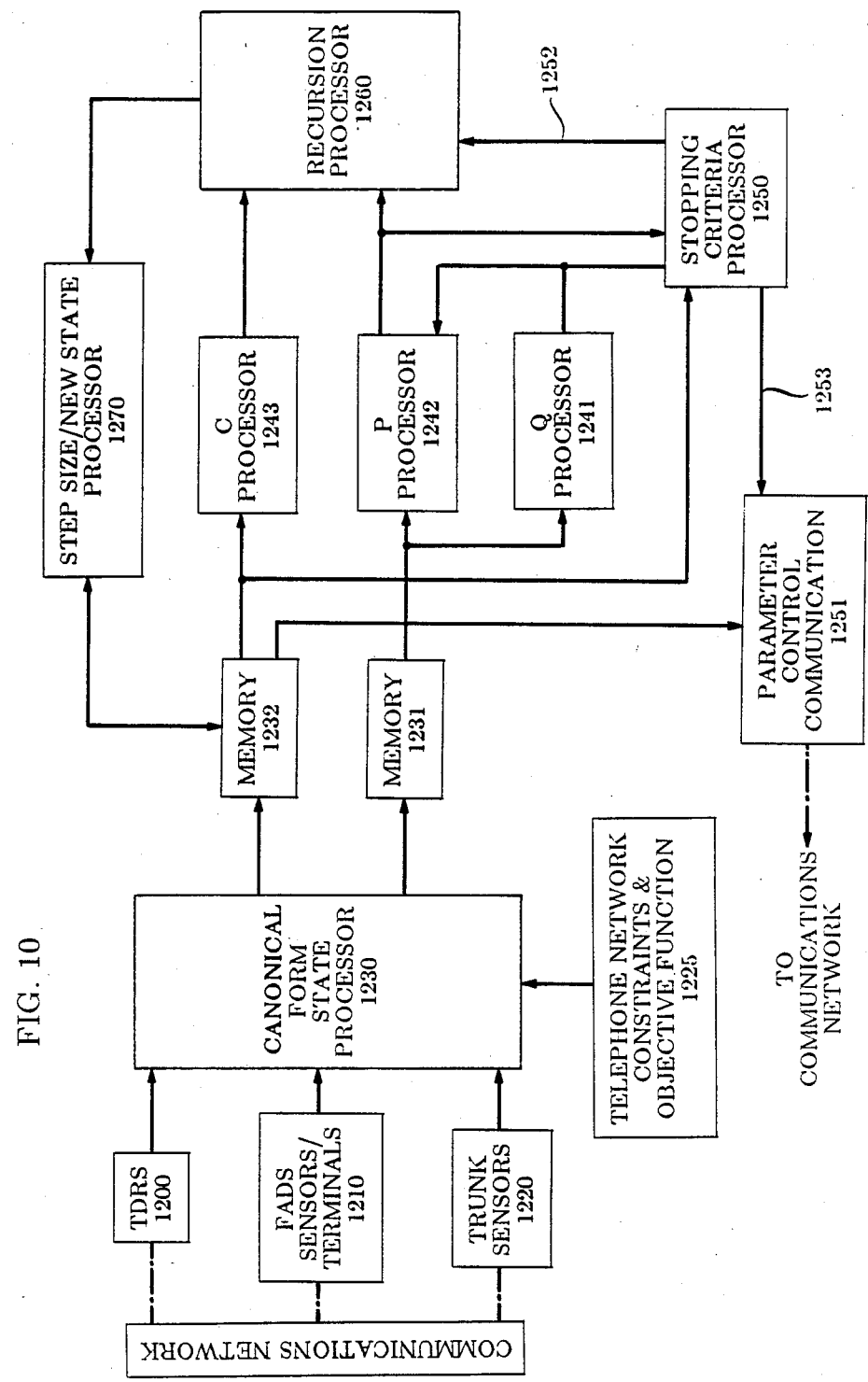
FIG. 10 depicts one hardware embodiment for implementing the steps described in FIGS. 4-6.

Implementation of our process in hardware is most easily accomplished by directing attention to the blocks in, for example, FIGS. 4-5, and implementing each block in a hardware module. The hardware blocks may be physically different and separate elements, or they may be combined to reside in one physical machine. FIG. 10 depicts a system which employs a different module, or a number of modules, for the different blocks in FIGS. 4-5.

The FIG. 10 system is very useful in addressing the prevalent task of resource assignments in various enterprises, such as the airline industry or the telecommunications network. The telecommunications network presents a particularly interesting challenge because it is very large and because there is real and substantial financial reward in maintaining the network in an optimum operating state.

Briefly describing the situation, telecommunication traffic through the United States exhibits large geographic variations because of time zone differences, seasonal differences (particularly in vacation spots), holiday calling pattern differences, etc. In addition to predictable trends, unusual situations often arise which also affect the traffic. To best allocate the resources of the communications network so as to most effectively serve the public with the available resources, one must deal with many controllable variables. For example, telephone trunks of varying capacities are allocated to different types of traffic, traffic is assigned and reassigned to different intermediary routes, the work force is administered, etc. In quantitative terms, the task of structuring the AT&T communications network so as to place it at an optimum operating state involves over 1.2 million variables, over a 150,000 constraints and more than 100 long-distance switching offices. Consideration of the task on this detailed level has not been possible heretofore; but now, in accordance with the principles of our invention, the apparatus of FIG. 10 can handle this task in real time to automatically adjust the network to the changing traffic conditions.

In FIG. 10, modules 1200-1230 perform the data collection and conversion steps illustrated by block 200 in FIG. 3. Module 1251 performs the assignment of operating parameters step illustrated by block 250 in FIG. 3, and the remaining modules in FIG. 10 perform the steps encompassed by the iteration loop of FIG. 3.

Describing FIG. 10 in more detail, blocks 1200-1220 are the data providing elements, and they may be elements that presently exist in the telephone network. As an example, element 1200 represents a set of Traffic Data Recording Systems (TDRS) which are found in many telephone central offices. A TDRS measures the usage level of telephone trunks and groups of trunks in the central office and, currently, sends this information to a centrally located magnetic tape recorder. Element 1210, represents a set of Force Administration Data Systems (FADS) terminals which are used by the telephone companies to assess the level of work force required at different locations based on existing and expected traffic conditions. Element 1220, represents a set of route status sensors that detect overload or malfunction conditions in the transmission network. Other sources of data pertaining to the controllable parameters of the telephone network may be employed, but for the illustrative purposes of this disclosure only elements 1200, 1210 and 1220 are shown in FIG. 10.

The data providing elements of FIG. 10 are connected to processor 1230, to which memories 1231 and 1232 are also connected. Also connected to processor 1230 is an input device 1225 which specifies the network constraints and the objective function which is wished to be minimized. As explained earlier, the constraints set the ground rules for permissible states of the telephone network. As an example, some of the constraints are of the form the number of trunks between New York and Boston devoted to data, plus the number of trunks devoted to TV, plus the number of trunks devoted to voice is less than or equal to a fixed value (corresponding to the total number of trunks between New York and Boston). Information concerning the actual division of trunks is provided by the sensors of FIG. 10, whereas the fixed value is a constraint supplied by device 1225. The objective function supplied by device 1225 is a statement of the desired optimization; such as an enumeration of the different cost and benefit consequences from the use of different resources of the network.

Processor 1230 accepts the inputs provided by sensors 1200-1220, structures the data in the canonical form described above (and in block 100 in FIG. 4), and stores the structured input in memory 1231 in a predetermined manner so as to create the matrices A and $\bar{A}$. Processor 1230 also communicates the objective function c and the current state of the system (as reflected by the controllable parameters identified by sensors 1200-1220 and augmented by the transformations performed by processor 1230) to memory 1232.

Based on the information available at memories 1231 and 1232 processors 1241, 1242 and 1243 compute the $\bar{c}$ vector, the P matrix and the Q matrix, respectively, in accordance with block 110 of FIG. 4. These computations may be done with standard mathematical techniques which, of course, form no part of our invention. Having computed the P and Q matrices and the augmented vector $\bar{c}$, processor 1250 is ready to compute the $\delta$ and $\gamma$ signals specified in block 120 of FIG. 4 (receiving the c and x vectors needed for these computations from memory 1232). These signals are used in processor 1250 to determine whether the stopping criterion has been met. When it is, processor 1250 disables processor 1260 (via line 1252) and enables processor 1251 (via line 1253); otherwise, processor 1251 is disabled and processor 1260 is enabled.

Processor 1260 is responsible for recursively computing the values of $\alpha$ coefficients for $\rho(t)$ and the values of $v_k$ coefficients, based on P obtained from processor 1242, $\bar{c}$ obtained from processor 1241, and c obtained from memory 1232. The number of recursions, k, within processor 1260 is selected based on the degree of the desired polynomial approximation. The processes, however, are repetitive and straightforward, as described in block 130 of FIG. 5.

To complete the iteration, the polynomial approximation derived by processor 1260 is applied to processor 1270, where the tentative new state of the system is determined. It is there that a step size is selected, a new state is derived for the selected step, and the derived state is evaluated to determine whether it is strictly feasible. When the state is found not to be strictly feasible, the step size is reduced and the process is repeated. When the state of the system is found to be strictly feasible, then it is reprojected to place the state of the system in the center of the polytope, and that new tentative state of the system is placed in memory 1232.

Finally, when the stopping criteria are met, control passes to processor 1251 which fetches the latest tentative state of the system from memory 1232 and concludes that this is the desired state of the system. With conventional circuitry, the desired state of the system is either implemented directly, by processor 1251 communicating switch control commands to the system, or indirectly, by processor 1251 sending messages to personnel who effect the specified changes. In the case of the FIG. 10 telephone plant optimization system, processor 1251 controls the trunk assignments and routing processors (already in the telephone plant) directly, and sends electronic messages to AFADS to schedule and assign the work force where its needed.

In the above communications system, scheduling forms merely a part of the optimization task. In many other applications scheduling takes a more central role in optimally allocating resources. Optimization of scheduling is a common task in many industries where resources, supplies, facilities and customers are diverse and geographically scattered. One example of such an industry is oil refining where there is a multitude of controllable parameters, constraints, and cost factors. Examples of the above are price of crude in different oil-producing countries, on the spot market, and on the various tankers already in transit, anticipated arrival time of tankers at different ports, cost of moving the crude to the refineries, capacities and operating constraints of the refineries, import use and other taxes, needs of different customers for different refining products, locations of customers vis-a-vis the refineries, distribution network costs, inventory controls, etc. The number of controllable variables—which are the scheduled assignments—can run into thousands, and more.

Figure 11:
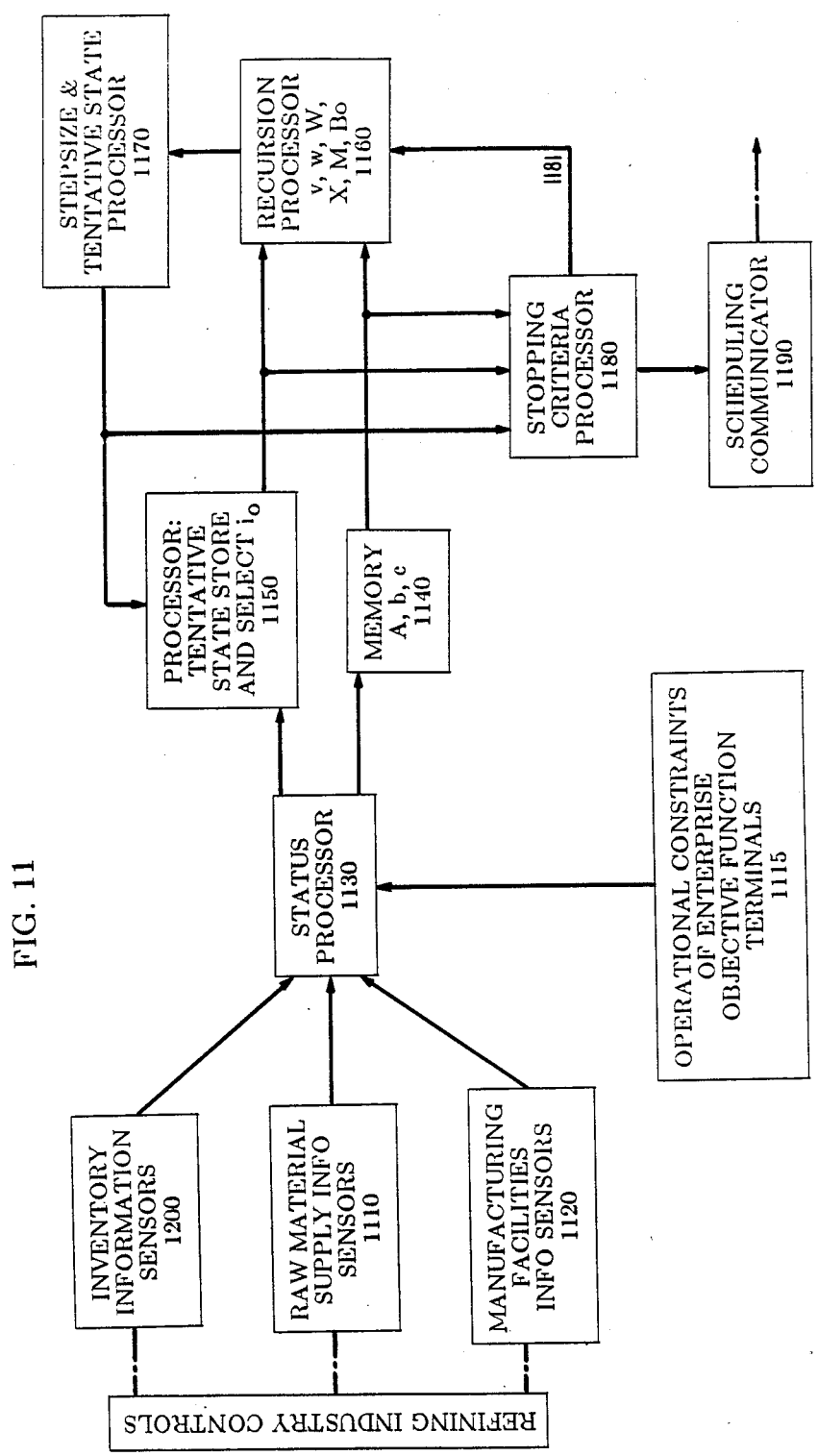
FIG. 11 depicts one hardware embodiment for implementing the steps described in FIGS. 7-8.

In the context of such a scheduling task the method of our invention, represented by the flow chart of FIGS. 4-5, can be employed in apparatus such as described by FIG. 10; or as embodied in the flow chart of FIGS. 7-8, can be employed in apparatus such as described by FIG. 11.

For illustrative purposes, FIG. 11 depicts a scheduling/resource allocation optimizer for an oil refining enterprise. The optimizer employs elements that individually are quite conventional, in combination, to effectuate the method of our invention. Elements 1100-1120 are sensors that represent the state of the enterprise with respect to those parameters that can directly or indirectly be controlled. Element 1100 in FIG. 11 represents a set of "inventory information" sources which report on the inventory level at the different storage facilities of the enterprise. This may include automatic level reading apparatus, computer databases in combination with data communication apparatus, etc. Element 1110 represents a set of "raw materials supply information" sources, and they may be similar in kind to the sources employed by the 1100 set of sensors. Elements 1110 report, for example, of the available supplies on different tankers at sea and at depots of different suppliers, and so forth. Element 1120 is a set of "manufacturing facilities information" sources, and they may contain sensors for supplying information concerning the operation level (e.g., a percentage of capacity) of each facility.

All signals from the various sensors are applied to processor 1130, but in addition to these signals, element 1115 provides information to processor 1130 relating to the operational constraints of the enterprise, the cost factors, and the objective function which forms the criterion for measuring performance of the enterprise. Processor 1130 selects the necessary slack variables and develops the matrix A as specified by equation 19 above.

Processor 1130 stores the A matrix and the b and c vectors of equation 19 in memory 1140, and applies the present (unoptimized) state of the enterprise, y, to processor 1150. Processor 1150 selects the coordinate $i_o$ in accordance with equation 24. The contents of memory 1140 and the output of processor 1150 are made available to recursion processor 1160.

Processor 1160 recursively develops the $v_k$ coefficients that enable one to compute the next tentative state of the enterprise whose resources are to be optimally scheduled. first, signals $w_o$, $W_o$, $X_o$ and $M_o$ are derived in processor 1160 in accordance with equations 29-34, from which coefficients $\beta_o$ and $\alpha_o$ are developed per equations 35-36. The coefficient $v_1$ is then developed as described by equation 37, signals $w_1$, $W_1$, $X_1$ and $M_1$ are developed per equation 38 and a $v_1$ signal is developed in accordance with equation 39. From $v_1$, $\alpha_1$ and $v_1$ are developed per equations 40 and 41, bringing processor 1160 to the point where the next recursion can begin, to develop $\alpha_2$ and $v_2$. When the desired number of coefficients is developed in processor 1160, the next tentative state of the enterprise can be determined with the aid of equation 26; once the step size, t, is selected.

The step size selection and the actual determination of the next tentative state is developed in processor 1170. As before, the step selection may proceed in a very simple manner by selecting $t=0.95$ and evaluating the resultant tentative state. If that state is strictly feasible, then the value of t is accepted, the new tentative step is accepted, and a new iteration is initiated with processor 1170 placing the tentative state into processor 1150 and enabling processor 1150 to select a new coordinate position, $i_o$. When it is determined that the resultant state is not strictly feasible, a smaller value of t is selected and a new tentative state is computed and evaluated, as before.

Of course, one must also select a test for determining when the tentative state developed is close enough to the optimum state, enabling one to terminate the scheduling process. This test is made in processor 1180, and it may follow, for example, the test described in equation 46. Stopping the process is achieved with control lead 1181 emanating from processor 1180 and terminating at processor 1260. When the optimization process is complete, processor 1180 transfers the desired state of the enterprise to scheduling communicator 1190 which transmits the various scheduling assignments to the enterprise.

The above specification of our invention contains a number of specific illustrative embodiments. These are intended for explanatory purposes and should not be construed as a limitation on our invention, since many changes and modifications can easily be contemplated by those skilled in the art that do not depart from the spirit and scope of our invention.

What is claimed is:

1. Apparatus for optimizing the operational state of a system in accordance with a preselected operational criterion by adjusting values of operational parameters describing said state of said system, said operational parameters being adjustable within a preselected set of constraints, characterized by:

first means, responsive to a "true" activation control signal, for developing a tentative state-of-the-system signal representation based on said values of said operational parameters, and for scaling said tentative state-of-the-system signal representation in accordance with an affine scaling vector field that describes the direction of steepest descent in a transformed space to an optimum state of said system in consonance with said operational criterion;

second means responsive to said first means for developing a trajectory curve of order greater than one that approximates said vector field at said tentative state-of-the-system and for modifying said scaled tentative state-of-the-system signal representation to place said tentative state-of-the-system at a point along said curve to form a new tentative state-of-the-system;

third means responsive to said second means for developing said activation control signal, and setting it to "true" when said new tentative state of the system is not within a preselected stopping region, and setting it to "false" when said tentative state of the system is within said preselected stopping region; and fourth means, responsive to said third means, for setting said operational parameters of said system in accordance with said tentative state-of-the-system when said activation control signal is "false".

2. Apparatus for optimizing the operational state of a system described by a set of operational parameters, with said optimizing accomplished by adjusting values of said operational parameters within a preselected set of constraints to maximize an objective function, comprising:

sensors for developing signal representations of said values of said operational parameters;

a first processor, responsive to said signal representations of said sensors, to applied values of said constraints and to said operational criterion, for developing an initial signal representation of the task of said optimizing in terms of maximizing: $b^T y$ Subject to: $A^T y \leq c$ where b is a vector of signals related to said objective function, y is a vector of signals related to said operational parameters, c is a vector of signals related to said set of preselected set of constraints values, $A=(a_{11}, a_{12}, \ldots, a_{ij}, \ldots, a_{mn})$ is an m by n matrix of coefficient signals related to said preselected constraints, and developing a w vector signal such that $$A^T y + w = c$$

and $$w \geq 0;$$

a second processor, responsive to said first processor, for selecting a coordinate in said operational parameters corresponding to a coordinate in said objective function that is most rapidly increasing in comparison to other coordinates;

a memory for storing said A, b and c signal sets;

a third processor, responsive to said second processor and to said memory, for computing a power series function in said transformed space of order greater than one that approximates a trajectory curve in consonance with said objective function; and a controller, responsive to said third processor, for setting said operational parameters of said system at values corresponding to a point in said transformed space and along said curve.

3. The apparatus of claim 2 wherein said third processor recursively computes m $v_i$ vector coefficients which describe said curve in accordance with $$y = \sum_{j=1}^{m} v_j t^j$$

where t is a step size along said curve and m is a prechosen constant.

4. The apparatus of claim 3 wherein said coefficient vectors $v_j$ are evaluated recursively in accordance with:

$$v_{j+1} = v_{j+1} + \frac{\alpha_j}{j+1} M_0^{-1} b.$$

where $$v_{j+1} = \frac{-1}{j+1} M_0^{-1} \left( \sum_{k=1}^{j} (j+1-k) M_k v_{j+1-k} \right),$$

$$\alpha_j = -(j+1)\beta_0^{-1}(v_{j+1})_{i_0},$$

$$M_k = A X_k A^T,$$

$$M_0 = A X_0 A^T,$$

$$\beta_0 = (M_0 b)_{i_0},$$

$$\alpha_0 = (\beta_0)^{-1} w_{i_0},$$

$$v_1 = \alpha_0 M_0^{-1} b,$$

$$w_j = c - A^T v_j,$$

$$W_j = \text{diag}(w_j), \text{ and}$$

$$X_j = -W_0^{-2} \left[ \sum_{k=0}^{j-1} X_k \left( \sum_{l=0}^{j-k} W_1 W_{j-k-l} \right) \right], \text{ and.}$$

5. The apparatus of claim 3, further comprising means for selecting a value to said step size t such that y is strictly feasible.

6. The apparatus of claim 5 wherein said controller employs means for setting operational parameters to evaluate a new tentative state of the system y and applies to said second processor.

7. The apparatus of claim 2 wherein said controller includes means for repeating the operations of said second and third processors to successively develop new tentative states of the system, and means for disabling said means from repeating when a new tentative state of the system complies with a preselected test.

8. In an electronic resource allocation optimizing apparatus, a method for changing assigned values of a plurality of controllable parameters of a physical system, x, where said parameters are linearly related to each other through inequality and equality constraint relationships, and where said changing of values aims to maximize a benefit specified by a linear objective relationship of said parameters comprising the steps of:

affine scaling of said parameters, x, of said system to a domain containing a vector field describing the steepest descent to an optimum allocation, wherein said system parameters are described by a vector signal y;

passing from a first set of values for said scaled parameters, y(1), that satisfy said constraint relationships to a second set of values for said scaled parameters, y(2), that also satisfy said constraint relationships, in correspondence with the equation $$y(2) = \sum_{k=1}^{m} v_k t^k,$$

where each of said $v_k$ vector coefficients is related to said first set of values and to said objective relationship, where m is a preselected integer, and t is a preselected step size;

physically changing values of said plurality of controllable parameters, x, of said physical system to a set of values of said controllable parameters, x, that correspond to one of said second set of values developed by said step of passing; and controlling said physical system in accordance with said changed controllable parameters.

9. A method for setting values to a plurality of controllable parameters of a physical system, subject to constraints, and where said assigning values aims to maximize a benefit specified by a linear objective relationship of said parameters comprising the steps of:

selecting a starting set of values x for said parameters that satisfy said constraint relationships;

affine scaling of said set of values and said objective relationship in accordance with a conversion process that smooths the benefit function in the space of said converted set of values;

developing an m plurality of coefficient sets $v_k$, where at least one of said coefficients for $k>1$ is not zero, related to said converted starting set of values and to said converted objective relationship, where m is a preselected integer;

selecting a step size t;

obtaining a second set of values for said parameters, y in accordance with the equation $$y = \sum_{k=1}^{m} v_k t^k;$$

a step of iterating through said steps of converting, developing coefficients, selecting step size and obtaining a set of values, where at each iteration following the first iteration said step of selecting a starting set comprises assigning the second set of values, y, of the previous iteration to the first set of values of said each iteration;

a step of stopping said iterating based on an evaluation of a preselected stopping rule;

setting values of said plurality of said controllable parameters of said system in correspondence with said second set of values developed by said step of obtaining immediately prior to said step of stopping; and controlling said physical system in accordance with said changed controllable parameters.

10. Apparatus for optimizing operational state of a system in accordance with a preselected operational criterion by adjusting values of operational parameters describing said state of said system, subject to a given set of linear constraints, characterized by sensors for developing signal representations of said values of said operational parameters;

first processing means, responsive to said signal representations, for scaling said signal representations to develop an affine scaling representation of said state of said system;

second processing means, responsive to said first processing means, for computing a power series function of order greater than one, that approximates a trajectory curve in said affine scaling representation in consonance with said operational criterion; and a controller for setting said operational parameters of said system at values corresponding to a point in said transformed space and along said curve.

11. The apparatus of claim 10 wherein said trajectory curve follows in a vector field that follows a generalized steepest descent direction of operational criterion.

12. A method for adjusting parameters of an industrial process, wherein said parameters are linearly related through inequality and equality constraint relationships, said adjusting being directed to optimize a linear objective function of said parameters, said method comprising the steps of:

affine scaling an initial set of values of said parameters to a domain wherein said parameters are represented by a vector in a vector field including vectors indicative of a steepest approach to a more optimum value of said objective function;

iteratively determining intermediate values of said scaled parameters by causing each of said scaled values to assume to a more optimum level that is related to the immediately previous level and to a step size;

testing the set of scaled values of said parameters obtained at each each of said steps of iteratively determining, against a preselected stopping rule;

applying values of said parameters that satisfy said stopping rule to said industrial process and adjusting said parameters of said industrial process; and controlling said physical industrial process in accordance with said changed controllable parameters.

13. The method of claim 12 wherein said industrial process is an airline scheduling process, and wherein said parameters correspond to allocation of planes to specified routes.

14. The method of claim 12 wherein said industrial process is a telecommunications call routing process, and wherein said parameters correspond to allocation of call routing paths to specified call-carrying facilities.

* * * * *